United States Patent
Fu et al.

(10) Patent No.: US 10,314,319 B2
(45) Date of Patent: Jun. 11, 2019

(54) METHOD AND APPARATUS FOR ACCELERATED OR CONTROLLED DEGASSING OF ROASTED COFFEE

(71) Applicant: 2266170 Ontario Inc., Mississauga (CA)

(72) Inventors: Yucheng Fu, Mississauga (CA); Stephen Leung, Markham (CA)

(73) Assignee: 2266170 Ontario Inc., Mississauga (CA)

( * ) Notice: Subject to any disclaimer, the term of this patent is extended or adjusted under 35 U.S.C. 154(b) by 502 days.

(21) Appl. No.: 14/547,382

(22) Filed: Nov. 19, 2014

(65) Prior Publication Data

US 2015/0140184 A1    May 21, 2015

Related U.S. Application Data

(60) Provisional application No. 61/906,513, filed on Nov. 20, 2013.

(51) Int. Cl.
    *A23F 5/10*    (2006.01)
(52) U.S. Cl.
    CPC .................... *A23F 5/105* (2013.01)
(58) Field of Classification Search
    CPC ......... A23F 5/105; A23F 5/08; A47J 31/0673; A47J 31/36; A47J 31/3623; A47J 31/3695;
(Continued)

(56) References Cited

U.S. PATENT DOCUMENTS 2,110,518 A * 3/1938 Becker ............... B65D 81/2076
                                                        137/595
2,113,715 A * 4/1938 Wilcox .................... B65D 3/10
                                                          206/232

(Continued)

FOREIGN PATENT DOCUMENTS

CA         853634      10/1970
CA        1233690       3/1988
(Continued)

OTHER PUBLICATIONS

International Search Report and Written Opinion in PCT/CA2014/051107 dated Feb. 9, 2015.

(Continued)

*Primary Examiner* — Eric S Stapleton
(74) *Attorney, Agent, or Firm* — Manelli Selter PLLC; Edward J. Stemberger (57) ABSTRACT

An apparatus for accelerated or controlled degassing of roasted coffee. The apparatus comprises a container for receiving and retaining roasted coffee, a source of inert gas in fluid communication with the container, and a controller. The controller includes a timer and a valve. The valve is operatively associated with the source of inert gas and has an open and a closed position. When in its closed position the valve restricts the flow of inert gas into the container. When in its open position the valve permits the flow of inert gas into the container such that the inert gas displaces at least a portion of the gas in the container. The timer causes the valve to cycle between its open and closed positions at predetermined time intervals. The flow of inert gas can also be controlled through the use of a gas sensor in communication with the interior of the container.

18 Claims, 2 Drawing Sheets

(58) Field of Classification Search
CPC ... A47J 31/002; A47J 31/0668; A47J 31/4492
USPC .......... 99/284, 295, 299, 486, 468; 426/231
See application file for complete search history.

(56) References Cited

U.S. PATENT DOCUMENTS

| | | | | |
|---|---|---|---|---|
| 2,291,604 | A * | 8/1942 | Baselt | A23F 5/243 426/407 |
| 2,987,221 | A * | 6/1961 | Milton | B05B 7/1404 222/1 |
| 3,110,121 | A * | 11/1963 | Corrinet | B65D 3/263 40/306 |
| 3,119,695 | A * | 1/1964 | Kahan | A23F 5/243 426/116 |
| 3,282,703 | A * | 11/1966 | Broadhurst | A47J 31/22 426/433 |
| 3,333,963 | A * | 8/1967 | Moon | A23F 5/105 426/486 |
| 3,399,806 | A * | 9/1968 | Lucas | A47L 15/4418 137/67 |
| 3,506,446 | A * | 4/1970 | Champion | A23F 5/105 426/397 |
| 3,613,549 | A * | 10/1971 | Champion | B65B 25/001 99/472 |
| 3,713,936 | A * | 1/1973 | Ramsay A | D06M 23/18 156/242 |
| 3,799,049 | A * | 3/1974 | Smith, Jr. | A23F 5/12 99/470 |
| 3,821,430 | A * | 6/1974 | Reeves et al. | A23F 5/38 426/285 |
| 4,101,627 | A * | 7/1978 | Menier | B31D 5/02 264/163 |
| 4,131,064 | A * | 12/1978 | Ryan | C06B 23/008 102/293 |
| 4,161,549 | A * | 7/1979 | Ohno | A23F 5/02 426/456 |
| 4,220,673 | A * | 9/1980 | Strobel | A23F 3/18 426/435 |
| 4,235,160 | A * | 11/1980 | Olney | A47J 31/08 493/154 |
| 4,306,367 | A * | 12/1981 | Otto | B65D 5/4229 206/831 |
| 4,368,100 | A * | 1/1983 | Pyves | A23F 5/34 159/4.01 |
| 4,440,796 | A * | 4/1984 | Lunder | A23F 3/30 426/597 |
| 4,471,689 | A * | 9/1984 | Piana | B65D 85/8043 422/282 |
| 4,518,639 | A * | 5/1985 | Phillips | B65D 77/22 206/459.5 |
| 4,559,729 | A * | 12/1985 | White | B65D 17/00 220/906 |
| 4,619,830 | A * | 10/1986 | Napier | A47J 31/02 206/0.5 |
| 4,701,365 | A * | 10/1987 | Iwasaki | D04H 3/16 156/62.2 |
| 4,728,425 | A * | 3/1988 | Sandvig | A47J 31/06 210/477 |
| 4,748,030 | A * | 5/1988 | Illy | A23F 5/105 426/233 |
| 4,859,337 | A * | 8/1989 | Woltermann | B65D 85/816 210/474 |
| 4,865,737 | A * | 9/1989 | McMichael | B01D 29/232 210/477 |
| 4,867,993 | A * | 9/1989 | Nordskog | B65D 85/8043 426/110 |
| 4,890,637 | A * | 1/1990 | Lamparter | B65D 77/225 137/246 |
| 4,966,780 | A * | 10/1990 | Hargraves | B65D 51/1616 215/375 |
| 4,981,588 | A * | 1/1991 | Poulallion | A47J 31/02 210/474 |
| 4,983,410 | A * | 1/1991 | Dinos | B65D 85/8043 426/110 |
| 4,995,310 | A * | 2/1991 | van der Lijn | B65D 85/8043 210/282 |
| 4,996,066 | A * | 2/1991 | Love | B65D 85/8043 426/433 |
| 5,008,013 | A * | 4/1991 | Favre | B01D 29/03 210/482 |
| 5,076,433 | A * | 12/1991 | Howes | B65D 25/205 206/217 |
| 5,156,009 | A * | 10/1992 | Woodruff | A23L 3/3418 426/418 |
| 5,208,058 | A * | 5/1993 | Kotani | A23B 9/005 426/281 |
| 5,238,648 | A * | 8/1993 | Kremen | A47F 3/002 162/201 |
| 5,298,267 | A * | 3/1994 | Gruenbacher | B65D 85/8043 206/5 |
| 5,305,688 | A * | 4/1994 | Kotani | A23B 9/005 99/470 |
| 5,331,793 | A * | 7/1994 | Pophal | A47J 31/08 493/154 |
| 5,333,394 | A * | 8/1994 | Herdeman | A23B 7/148 34/218 |
| 5,361,560 | A * | 11/1994 | Sandolo | A23F 5/465 141/11 |
| 5,368,875 | A * | 11/1994 | Hibi | A23F 5/04 426/466 |
| 5,390,587 | A * | 2/1995 | Wu | E03C 1/046 210/449 |
| 5,447,631 | A * | 9/1995 | Mahlich | A47J 31/0663 210/455 |
| 5,456,929 | A * | 10/1995 | Mifune | B65D 81/3216 206/219 |
| 5,496,573 | A * | 3/1996 | Tsuji | B01D 39/163 210/508 |
| 5,532,011 | A * | 7/1996 | Goglio | B65B 9/20 426/316 |
| 5,536,290 | A * | 7/1996 | Stark | B01D 46/2414 55/498 |
| 5,575,383 | A * | 11/1996 | Seeley | B65D 5/4291 206/217 |
| 5,601,716 | A * | 2/1997 | Heinrich | A47J 31/08 210/490 |
| 5,605,710 | A * | 2/1997 | Pridonoff | A47J 31/02 206/0.5 |
| 5,658,607 | A * | 8/1997 | Herdeman | A23B 7/148 426/263 |
| 5,738,786 | A * | 4/1998 | Winnington-Ingram | A47G 19/16 206/5 |
| 5,768,859 | A * | 6/1998 | Goglio | B65B 9/20 426/397 |
| 5,806,582 | A * | 9/1998 | Santavuori | F24F 11/0009 165/104.31 |
| 5,822,951 | A * | 10/1998 | Rosik | B65B 57/18 53/167 |
| 5,840,189 | A * | 11/1998 | Sylvan | B65D 85/8043 210/233 |
| 5,858,437 | A * | 1/1999 | Anson | A47J 31/002 426/431 |
| 5,866,185 | A * | 2/1999 | Burkett | A47G 21/004 206/0.5 |
| 5,871,096 | A * | 2/1999 | Yakich | A63B 3/065 206/459.5 |
| 5,871,644 | A * | 2/1999 | Simon | A47J 31/08 156/148 |
| 5,882,716 | A * | 3/1999 | Munz-Schaerer | A23F 5/40 426/569 |
| 5,885,314 | A * | 3/1999 | Oussoren | B01D 46/0005 55/486 |
| 5,895,672 | A * | 4/1999 | Cooper | A47J 31/0615 426/433 |
| 5,896,686 | A * | 4/1999 | Howes | G09F 19/14 206/459.1 |

(56) References Cited

U.S. PATENT DOCUMENTS

| | | | | |
|---|---|---|---|---|
| 5,897,899 A * | 4/1999 | Fond | ............... | A47J 31/0678 426/112 |
| 5,908,652 A * | 6/1999 | Sakano | ............... | A23F 5/486 422/5 |
| 5,923,242 A * | 7/1999 | Slagle | ............... | G09F 27/00 340/328 |
| 5,957,279 A * | 9/1999 | Howes | ............... | A47G 21/182 206/216 |
| 5,971,195 A * | 10/1999 | Reidinger | ............... | B65D 51/28 215/227 |
| 6,025,000 A * | 2/2000 | Fond | ............... | B65D 85/8046 426/112 |
| 6,092,430 A * | 7/2000 | Liston | ............... | A23L 3/3418 422/3 |
| 6,146,270 A * | 11/2000 | Huard | ............... | A63F 3/00157 273/309 |
| 6,189,438 B1 * | 2/2001 | Bielfeldt | ............... | A47J 31/08 210/493.5 |
| 6,203,837 B1 * | 3/2001 | Kalenian | ............... | A23F 3/18 426/431 |
| 6,220,147 B1 * | 4/2001 | Priley | ............... | A47J 31/0615 99/299 |
| 6,223,937 B1 * | 5/2001 | Schmidt | ............... | B65D 47/06 215/363 |
| 6,337,098 B1 * | 1/2002 | Spencer | ............... | A23F 5/08 426/312 |
| 6,342,261 B1 * | 1/2002 | Spencer | ............... | A23B 4/16 426/312 |
| 6,440,256 B1 * | 8/2002 | Gordon | ............... | A47J 31/08 156/201 |
| 6,514,552 B1 * | 2/2003 | Sivetz | ............... | A23F 5/105 426/392 |
| 6,514,555 B1 * | 2/2003 | Fayard | ............... | A23G 9/20 426/516 |
| 6,548,433 B1 * | 4/2003 | Gbur | ............... | B65D 85/804 426/77 |
| 6,557,597 B2 * | 5/2003 | Riesterer | ............... | A47J 31/40 141/351 |
| 6,561,232 B1 * | 5/2003 | Frutin | ............... | B65D 51/2857 141/100 |
| 6,589,577 B2 * | 7/2003 | Lazaris | ............... | B65D 85/8043 206/0.5 |
| 6,606,938 B2 * | 8/2003 | Taylor | ............... | A47J 31/0642 426/433 |
| 6,607,762 B2 * | 8/2003 | Lazaris | ............... | B65D 85/8043 206/0.5 |
| 6,622,615 B2 * | 9/2003 | Heczko | ............... | A23L 2/00 426/113 |
| 6,644,173 B2 * | 11/2003 | Lazaris | ............... | A47J 31/3628 99/295 |
| 6,645,537 B2 * | 11/2003 | Sweeney | ............... | B65D 85/8043 206/222 |
| 6,658,989 B2 * | 12/2003 | Sweeney | ............... | A47J 31/0642 99/306 |
| 6,720,070 B2 * | 4/2004 | Hamaguchi | ............... | B01D 39/1623 428/357 |
| 6,758,130 B2 * | 7/2004 | Sargent | ............... | A23F 3/14 426/115 |
| 6,810,788 B2 * | 11/2004 | Hale | ............... | B65D 85/8043 426/433 |
| 6,841,185 B2 * | 1/2005 | Sargent | ............... | A23F 5/465 426/443 |
| 6,854,378 B2 * | 2/2005 | Jarisch | ............... | A47J 31/3695 426/433 |
| 6,861,086 B2 * | 3/2005 | Buckingham | ............... | A23F 5/105 426/395 |
| 6,869,627 B2 * | 3/2005 | Perkovic | ............... | B65D 85/8043 206/0.5 |
| 6,913,777 B2 * | 7/2005 | Rebhorn | ............... | B65B 29/10 206/217 |
| 6,959,832 B1 * | 11/2005 | Sawada | ............... | B65D 77/206 220/266 |
| 6,992,586 B2 * | 1/2006 | Rosenfeld | ............... | G06K 19/07758 340/572.1 |
| 7,067,038 B2 * | 6/2006 | Trokhan | ............... | D21F 11/006 162/109 |
| 7,153,530 B2 * | 12/2006 | Masek | ............... | B65D 85/8043 426/112 |
| 7,169,418 B2 * | 1/2007 | Dalton | ............... | B65D 21/0217 220/366.1 |
| 7,169,419 B2 * | 1/2007 | Dalton | ............... | B65D 21/0217 426/110 |
| 7,279,188 B2 * | 10/2007 | Arrick | ............... | B65D 85/8043 426/112 |
| 7,311,209 B2 * | 12/2007 | Bentz | ............... | B01D 39/18 162/129 |
| 7,325,479 B2 * | 2/2008 | Laigneau | ............... | A47J 31/3695 99/295 |
| 7,328,651 B2 * | 2/2008 | Halliday | ............... | A47J 31/0673 426/115 |
| 7,387,063 B2 * | 6/2008 | Vu | ............... | A47J 31/007 206/217 |
| 7,412,921 B2 * | 8/2008 | Hu | ............... | A47J 31/0668 426/77 |
| 7,419,692 B1 * | 9/2008 | Kalenian | ............... | A23F 5/28 426/433 |
| 7,444,925 B2 * | 11/2008 | Mahlich | ............... | A47J 31/3623 99/289 P |
| 7,490,542 B2 * | 2/2009 | Macchi | ............... | A47J 31/3695 426/433 |
| 7,543,527 B2 * | 6/2009 | Schmed | ............... | A47J 31/0673 426/115 |
| 7,552,672 B2 * | 6/2009 | Schmed | ............... | B65D 85/8043 426/115 |
| 7,552,673 B2 * | 6/2009 | Levin | ............... | A61J 9/00 426/433 |
| 7,594,470 B2 * | 9/2009 | Scarchilli | ............... | B65D 85/8046 426/79 |
| 7,624,673 B2 * | 12/2009 | Zanetti | ............... | B65D 85/8043 426/112 |
| 7,640,842 B2 * | 1/2010 | Bardazzi | ............... | A47J 31/0673 99/295 |
| 7,681,492 B2 * | 3/2010 | Suggi Liverani | .. | B65D 85/8043 426/115 |
| 7,685,930 B2 * | 3/2010 | Mandralis | ............... | A47J 31/36 99/295 |
| 7,698,992 B2 * | 4/2010 | Wei | ............... | A47J 31/0615 99/280 |
| 7,763,300 B2 * | 7/2010 | Sargent | ............... | A23F 5/465 426/443 |
| 7,765,733 B1 * | 8/2010 | Liu | ............... | A01M 17/008 43/124 |
| 7,775,019 B2 * | 8/2010 | Haak | ............... | B65B 9/20 53/135.3 |
| 7,798,055 B2 * | 9/2010 | Mandralis | ............... | A47J 31/0673 99/284 |
| 7,854,192 B2 * | 12/2010 | Denisart | ............... | A47J 31/3695 99/295 |
| 7,856,920 B2 * | 12/2010 | Schmed | ............... | A47J 31/0673 99/289 R |
| 7,856,921 B2 * | 12/2010 | Arrick | ............... | B65D 85/8043 426/112 |
| 7,910,145 B2 * | 3/2011 | Reati | ............... | B26F 1/40 426/425 |
| 8,062,682 B2 * | 11/2011 | Mandralis | ............... | B65D 85/8043 206/219 |
| 8,067,049 B2 * | 11/2011 | Hibi | ............... | A23F 5/105 426/316 |
| 8,225,771 B2 * | 7/2012 | Aso | ............... | F02D 41/0082 123/179.3 |
| 8,252,351 B2 * | 8/2012 | Ozanne | ............... | A47J 31/3695 426/433 |
| 8,256,190 B2 * | 9/2012 | Bowden | ............... | B65B 11/025 426/316 |
| 8,286,547 B1 * | 10/2012 | Lassota | ............... | A47J 31/20 99/280 |
| 8,361,527 B2 * | 1/2013 | Winkler | ............... | A47J 31/3695 426/77 |

(56) References Cited

U.S. PATENT DOCUMENTS

| | | | | |
|---|---|---|---|---|
| 8,409,646 B2* | 4/2013 | Yoakim | A47J 31/0642 | 426/115 |
| 8,425,957 B2* | 4/2013 | Steenhof | A23F 3/32 | 426/433 |
| 8,431,175 B2* | 4/2013 | Yoakim | A47J 31/22 | 426/431 |
| 8,474,368 B2* | 7/2013 | Kilber | A47J 31/0673 | 426/77 |
| 8,475,854 B2* | 7/2013 | Skalski | A47J 31/0668 | 426/115 |
| 8,481,097 B2* | 7/2013 | Skalski | A47J 31/0668 | 426/115 |
| 8,573,114 B2* | 11/2013 | Huang | A47J 31/32 | 99/281 |
| 8,591,978 B2* | 11/2013 | Skalski | A47J 31/0668 | 426/115 |
| 8,673,379 B2* | 3/2014 | Skalski | A47J 31/0668 | 426/115 |
| 8,740,020 B2* | 6/2014 | Marina | A47J 31/407 | 222/129 |
| 8,834,948 B2* | 9/2014 | Estabrook | A47J 31/407 | 426/115 |
| 8,881,948 B1* | 11/2014 | Lassota | B67D 1/0044 | 222/129.1 |
| 8,960,078 B2* | 2/2015 | Hristov | A47J 31/0673 | 426/79 |
| 2002/0020659 A1* | 2/2002 | Sweeney | B65D 85/8043 | 210/416.3 |
| 2002/0144603 A1* | 10/2002 | Taylor | A47J 31/32 | 99/295 |
| 2003/0005826 A1* | 1/2003 | Sargent | A23F 3/14 | 99/279 |
| 2003/0010787 A1* | 1/2003 | Dalton | B65D 21/0217 | 426/35 |
| 2003/0039731 A1* | 2/2003 | Dalton | B65D 85/8043 | 426/433 |
| 2003/0087005 A1* | 5/2003 | Baron | A23C 9/156 | 426/85 |
| 2004/0137110 A1* | 7/2004 | Dalton | B65D 21/0217 | 426/35 |
| 2004/0178232 A1* | 9/2004 | Langlois | A47F 1/03 | 222/544 |
| 2005/0016383 A1* | 1/2005 | Kirschner | B65D 85/8043 | 99/279 |
| 2005/0051478 A1* | 3/2005 | Karanikos | B65D 85/8043 | 210/469 |
| 2005/0287251 A1* | 12/2005 | Lazaris | B65D 85/8043 | 426/106 |
| 2006/0236871 A1* | 10/2006 | Ternite | B65D 85/8043 | 99/295 |
| 2006/0246187 A1* | 11/2006 | Egolf | A21C 15/005 | 426/116 |
| 2007/0144356 A1* | 6/2007 | Rivera | A47J 31/08 | 99/295 |
| 2007/0148290 A1* | 6/2007 | Ternite | B65D 85/8043 | 426/90 |
| 2007/0275125 A1* | 11/2007 | Catani | A23L 2/52 | 426/72 |
| 2008/0015098 A1* | 1/2008 | Littlejohn | A47G 19/03 | 493/152 |
| 2008/0142115 A1* | 6/2008 | Vogt | B67D 1/0007 | 141/374 |
| 2008/0156196 A1* | 7/2008 | Doglioni Majer | A47J 31/0668 | 99/295 |
| 2008/0202075 A1* | 8/2008 | Kronawittleithner | B32B 27/32 | 53/467 |
| 2008/0233265 A1* | 9/2008 | Hibi | A23F 5/105 | 426/595 |
| 2008/0245236 A1* | 10/2008 | Ternite | A47J 31/0668 | 99/295 |
| 2008/0302825 A1* | 12/2008 | Illy | A47J 47/01 | 222/152 |
| 2009/0110775 A1* | 4/2009 | Rijskamp | A47J 31/3628 | 426/77 |
| 2009/0133584 A1* | 5/2009 | De Graaff | A47J 31/405 | 99/279 |
| 2009/0165228 A1* | 7/2009 | Kilkenny | A01N 37/36 | 15/104.94 |
| 2009/0175986 A1* | 7/2009 | Doglioni Majer | B65D 85/8043 | 426/77 |
| 2009/0183640 A1* | 7/2009 | Ozanne | A47J 31/3695 | 99/295 |
| 2009/0186141 A1* | 7/2009 | Almblad | A23G 9/045 | 426/590 |
| 2009/0206084 A1* | 8/2009 | Woolf | B65D 81/3205 | 220/500 |
| 2009/0211458 A1* | 8/2009 | Denisart | B65D 85/8043 | 99/300 |
| 2009/0232947 A1* | 9/2009 | Buisson | B65B 51/1644 | 426/118 |
| 2009/0260690 A1* | 10/2009 | Bell | B65B 7/2835 | 137/1 |
| 2009/0311389 A1* | 12/2009 | Zoss | B65D 51/247 | 426/120 |
| 2009/0324791 A1* | 12/2009 | Ohresser | A47J 31/0673 | 426/433 |
| 2010/0003379 A1* | 1/2010 | Zoss | B65D 51/247 | 426/115 |
| 2010/0028495 A1* | 2/2010 | Novak | A47J 31/0668 | 426/77 |
| 2010/0116772 A1* | 5/2010 | Teys | A46B 11/001 | 215/228 |
| 2010/0215808 A1* | 8/2010 | Versini | B65D 85/8043 | 426/77 |
| 2010/0239733 A1* | 9/2010 | Yoakim | A47J 31/3623 | 426/431 |
| 2010/0239734 A1* | 9/2010 | Yoakim | A47J 31/22 | 426/433 |
| 2010/0303964 A1* | 12/2010 | Beaulieu | B65D 85/8043 | 426/77 |
| 2011/0003040 A1* | 1/2011 | Graf | A23C 11/00 | 426/98 |
| 2011/0033580 A1* | 2/2011 | Biesheuvel | A23F 5/18 | 426/77 |
| 2011/0041469 A1* | 2/2011 | Fischer | B01D 46/2411 | 55/498 |
| 2011/0045144 A1* | 2/2011 | Boussemart | B65D 85/8043 | 426/80 |
| 2011/0076361 A1* | 3/2011 | Peterson | B65D 85/8043 | 426/79 |
| 2011/0183048 A1* | 7/2011 | Noble | A23F 5/32 | 426/122 |
| 2011/0185911 A1* | 8/2011 | Rapparini | B65D 65/466 | 99/295 |
| 2011/0247975 A1* | 10/2011 | Rapparini | B65D 65/466 | 210/321.6 |
| 2011/0250339 A1* | 10/2011 | Onishi | A23F 5/105 | 426/546 |
| 2011/0256273 A1* | 10/2011 | de Graaff | A47J 31/42 | 426/112 |
| 2012/0006205 A1* | 1/2012 | Vanni | B65D 85/8043 | 99/295 |
| 2012/0024160 A1* | 2/2012 | Van Os | A47J 31/42 | 99/280 |
| 2012/0052163 A1* | 3/2012 | Doleac | A47J 31/407 | 426/112 |
| 2012/0070542 A1* | 3/2012 | Camera | B65D 85/8043 | 426/77 |
| 2012/0097602 A1* | 4/2012 | Tedford | B65D 65/466 | 210/500.1 |
| 2012/0121764 A1* | 5/2012 | Lai | A47J 31/3623 | 426/77 |
| 2012/0171334 A1* | 7/2012 | Yoakim | A47J 31/22 | 426/87 |
| 2012/0174794 A1* | 7/2012 | Fraij | A47J 31/4485 | 99/295 |

(56) References Cited

U.S. PATENT DOCUMENTS

| | | | |
|---|---|---|---|
| 2012/0180670 A1* | 7/2012 | Yoakim | B65D 85/8043 99/295 |
| 2012/0180671 A1* | 7/2012 | Baudet | A47J 31/407 99/295 |
| 2012/0183649 A1* | 7/2012 | Burkhalter | A47J 31/002 426/77 |
| 2012/0186457 A1* | 7/2012 | Ozanne | A47J 31/4428 99/287 |
| 2012/0196008 A1* | 8/2012 | York | B65D 85/8043 426/112 |
| 2012/0199007 A1* | 8/2012 | Larzul | A47J 31/3633 99/281 |
| 2012/0199010 A1* | 8/2012 | Mariller | A47J 31/0668 99/295 |
| 2012/0199011 A1* | 8/2012 | Cheng | A47J 31/3628 99/295 |
| 2012/0201933 A1* | 8/2012 | Dran | B65D 85/8043 426/80 |
| 2012/0207893 A1* | 8/2012 | Kruger | A47J 31/3633 426/431 |
| 2012/0207894 A1* | 8/2012 | Webster | A47J 31/3638 426/433 |
| 2012/0210876 A1* | 8/2012 | Glucksman | A47J 31/057 99/281 |
| 2012/0210878 A1* | 8/2012 | Mariller | A47J 31/0668 99/295 |
| 2012/0210879 A1* | 8/2012 | Mariller | B65D 85/8043 99/295 |
| 2012/0231123 A1* | 9/2012 | Kamerbeek | A47J 31/368 426/112 |
| 2012/0231124 A1* | 9/2012 | Kamerbeek | A47J 31/368 426/112 |
| 2012/0231126 A1* | 9/2012 | Lo Faro | A47J 31/407 426/115 |
| 2012/0231133 A1* | 9/2012 | Kamerbeek | A47J 31/0673 426/431 |
| 2012/0251668 A1* | 10/2012 | Wong | B65D 85/8043 426/77 |
| 2012/0251669 A1* | 10/2012 | Kamerbeek | A47J 31/0673 426/77 |
| 2012/0251670 A1* | 10/2012 | Kamerbeek | A47J 31/0673 426/77 |
| 2012/0251671 A1* | 10/2012 | Kamerbeek | A47J 31/368 426/77 |
| 2012/0251692 A1* | 10/2012 | Kamerbeek | A47J 31/0673 426/431 |
| 2012/0251693 A1* | 10/2012 | Kamerbeek | A47J 31/0673 426/431 |
| 2012/0251694 A1* | 10/2012 | Kamerbeek | A47J 31/368 426/433 |
| 2012/0258204 A1* | 10/2012 | Tsuji | A47J 31/20 426/77 |
| 2012/0258210 A1* | 10/2012 | Wong | A47J 31/3695 426/115 |
| 2012/0258219 A1* | 10/2012 | Wong | A47J 31/3695 426/394 |
| 2012/0258221 A1* | 10/2012 | Wong | A47J 31/3695 426/431 |
| 2012/0260806 A1* | 10/2012 | Rolfes | A47J 31/38 99/285 |
| 2012/0263829 A1* | 10/2012 | Kamerbeek | A47J 31/0673 426/77 |
| 2012/0263830 A1* | 10/2012 | Kamerbeek | A47J 31/0673 426/77 |
| 2012/0263833 A1* | 10/2012 | Wong | A47J 31/3695 426/115 |
| 2012/0266755 A1* | 10/2012 | Baudet | A47J 31/3633 99/295 |
| 2012/0269933 A1* | 10/2012 | Rapparini | B65D 85/8043 426/82 |
| 2012/0272830 A1* | 11/2012 | Gugerli | A47J 31/0668 99/295 |
| 2012/0276252 A1* | 11/2012 | Bunke | A23F 5/262 426/77 |
| 2012/0276255 A1* | 11/2012 | Verbeek | A47J 31/405 426/112 |
| 2012/0297987 A1* | 11/2012 | Lee | A47J 31/0663 99/286 |
| 2012/0301581 A1* | 11/2012 | Abegglen | B65D 85/8043 426/112 |
| 2012/0307024 A1* | 12/2012 | Howes | H04N 7/18 348/61 |
| 2012/0308688 A1* | 12/2012 | Peterson | A47J 31/002 426/86 |
| 2012/0312174 A1* | 12/2012 | Lambert | A47J 31/3638 99/295 |
| 2012/0321755 A1* | 12/2012 | Macaulay | A23G 1/56 426/115 |
| 2012/0321756 A1* | 12/2012 | Estabrook | A47J 31/407 426/115 |
| 2012/0328739 A1* | 12/2012 | Nocera | A47J 31/3623 426/77 |
| 2012/0328740 A1* | 12/2012 | Nocera | A47J 31/3623 426/82 |
| 2012/0328744 A1* | 12/2012 | Nocera | B65D 85/8043 426/106 |
| 2013/0004629 A1* | 1/2013 | Clark | A47J 31/4467 426/231 |
| 2013/0004637 A1* | 1/2013 | Gugerli | A47J 31/3638 426/433 |
| 2013/0008316 A1* | 1/2013 | Hoglauer | A47J 31/4407 99/295 |
| 2013/0011521 A1* | 1/2013 | Weijers | A47J 31/36 426/87 |
| 2013/0017303 A1* | 1/2013 | Vu | A47J 31/0689 426/433 |
| 2013/0025466 A1* | 1/2013 | Fu | A47J 31/08 99/295 |
| 2013/0032034 A1* | 2/2013 | Jarisch | A47J 31/3638 99/280 |
| 2013/0047863 A1* | 2/2013 | Larzul | A47J 31/3633 99/295 |
| 2013/0059039 A1* | 3/2013 | Trombetta | B65D 85/8043 426/82 |
| 2013/0059903 A1* | 3/2013 | Raman | C12N 5/0695 514/44 A |
| 2013/0068109 A1* | 3/2013 | Pribus | A47J 31/46 99/295 |
| 2013/0084368 A1* | 4/2013 | Linck | A23L 3/362 426/231 |
| 2013/0095219 A1* | 4/2013 | de Graaff | A47J 31/42 426/433 |
| 2013/0101717 A1* | 4/2013 | de Graaff | A47J 31/42 426/433 |
| 2013/0115342 A1* | 5/2013 | Van Os | A47J 31/42 426/231 |
| 2013/0122153 A1* | 5/2013 | Ferrier | A47J 31/3633 426/84 |
| 2013/0122167 A1* | 5/2013 | Winkler | A47J 31/3695 426/431 |
| 2013/0129870 A1* | 5/2013 | Novak | B65D 85/73 426/115 |
| 2013/0142931 A1* | 6/2013 | Fin | A47J 31/3633 426/433 |
| 2013/0199378 A1* | 8/2013 | Yoakim | A47J 31/22 99/283 |
| 2013/0259982 A1* | 10/2013 | Abegglen | B65D 85/8043 426/115 |
| 2013/0340626 A1* | 12/2013 | Oh | B65D 85/8043 99/295 |
| 2013/0344205 A1* | 12/2013 | Oh | B65D 85/8043 426/232 |
| 2014/0013958 A1* | 1/2014 | Krasne | A47J 31/407 99/284 |
| 2014/0037802 A1* | 2/2014 | Cardoso | B65D 85/8043 426/115 |
| 2014/0099388 A1* | 4/2014 | Wang | A23C 9/1307 424/725 |

(56) References Cited

U.S. PATENT DOCUMENTS

| | | | |
|---|---|---|---|
| 2014/0242239 A1* | 8/2014 | Boggavarapu | A23F 5/26 426/433 |
| 2015/0050391 A1* | 2/2015 | Rapparini | A23F 5/262 426/115 |
| 2016/0174590 A1* | 6/2016 | Boggavarapu | A23F 5/26 426/433 |

FOREIGN PATENT DOCUMENTS

| | | |
|---|---|---|
| CA | 2012891 | 9/1991 |
| CA | 2276927 | 1/2000 |
| CA | 2516417 A1 | 9/2004 |
| CA | 2689804 A1 | 3/2008 |
| CA | 2686347 A1 | 12/2008 |
| CA | 2807489 | 2/2012 |
| CA | 2824199 A1 | 8/2012 |
| CA | 2759782 A1 | 11/2012 |
| CA | 2801236 A1 | 3/2013 |
| CN | 202537195 | 11/2012 |
| CN | 202960136 | 6/2013 |
| DE | 4234991 | 4/1994 |
| EP | 0047169 A2 | 3/1982 |
| EP | 0145499 | 6/1985 |
| EP | 0432126 A1 | 6/1991 |
| EP | D678244 A2 | 10/1995 |
| EP | 1593329 | 11/2005 |
| EP | 1859683 | 11/2007 |
| EP | 2230195 | 9/2010 |
| EP | 2345351 | 7/2011 |
| EP | 2409608 | 1/2012 |
| EP | 1208782 | 8/2014 |
| FR | 2225095 | 11/1974 |
| FR | 2930522 A1 | 10/2009 |
| GB | 803486 A | 10/1958 |
| GB | 962038 | 6/1964 |
| GB | 1427949 | 3/1976 |
| GB | 2074838 | 11/1981 |
| GB | 2128068 | 4/1984 |
| GB | 1480997 | 7/1997 |
| GB | 2495642 | 4/2013 |
| JP | 662737 | 3/1994 |
| JP | 11171249 A | 6/1999 |
| KR | 20100127907 | 12/2010 |
| KR | 20140031693 | 3/2014 |
| WO | 0145616 A1 | 6/2001 |
| WO | 03082065 A1 | 10/2003 |
| WO | 2004083071 A1 | 9/2004 |
| WO | 2009114119 | 9/2009 |
| WO | 2010013146 A2 | 2/2010 |
| WO | 2010066705 | 6/2010 |
| WO | 2010085824 | 8/2010 |
| WO | 2011095518 | 8/2010 |
| WO | 201006516 A1 | 9/2010 |
| WO | 2010137956 A1 | 12/2010 |
| WO | 2012009605 | 1/2012 |
| WO | 2012031106 A1 | 3/2012 |
| WO | 2012069505 | 5/2012 |
| WO | 2014056862 | 4/2014 |
| WO | 2014112556 | 12/2014 |

OTHER PUBLICATIONS

Esegroth, "Inert gas: safeguard of quality", Vacuum, abstracts, vol. 2, Issue 1, p. 97, Dec. 31, 1952.

Anderson et al., "The diffusion kinetics of carbon dioxide in fresh roasted ground coffee", Journal of Food Engineering, vol. 59, Issue 1, pp. 71-78, Aug. 2003.

* cited by examiner

METHOD AND APPARATUS FOR ACCELERATED OR CONTROLLED DEGASSING OF ROASTED COFFEE

FIELD

This invention relates generally to a method and apparatus for accelerating or controlling the degassing of roasted coffee.

BACKGROUND

It is a well known fact that as a result of the roasting process coffee beans release carbon dioxide. It is also well known that one should preferably allow roasted coffee beans and ground coffee to degas prior to packaging in containers because the diffusion of carbon dioxide can cause the containers to expand or potentially rupture. It is further known to those in the coffee roasting industry that exposing roasted coffee to oxygen causes the coffee to oxidize, which can have a negative effect upon its taste. In addition, a substantial portion of the flavour and aromatics associated with roasted coffee can be stripped away from the coffee beans as the carbon dioxide evolves therefrom.

Recognizing that coffee should preferably be allowed to degas prior to packaging, while at the same time appreciating that efforts should be undertaken to prevent contact between the roasted coffee and atmospheric air and to help limit the stripping off of aromatics and exposing to oxygen, it is known to deposit the freshly roasted coffee into large totes, silos, bins or other storage containers (hereafter referred to as containers) where degassing can occur in an enclosed environment. The containers are either vented or have open tops to permit the carbon dioxide that diffuses from the roasted coffee to escape. The containers are also typically kept at atmospheric pressure while the coffee is allowed to degas, a process that can take anywhere from a few hours to a couple of days. Unfortunately, the inherent delay caused by waiting for the coffee to degas not only decreases the productivity of a roasting and packaging operation, but also necessitates the use of a number of containers to house the coffee during the degassing process. In a large roasting facility where multiple types and blends of coffee may be produced, the number of containers, their capital cost, and the floor space that they occupy can be significant.

SUMMARY

The invention therefore provides an apparatus for accelerated or controlled degassing of roasted coffee, the apparatus comprising a container for receiving and retaining roasted coffee; a source of inert gas in fluid communication with said container; and a controller, said controller including a timer and a valve, said valve operatively associated with said source of inert gas and having an open and a closed position, when in said closed position said valve restricting the flow of said inert gas into said container, when in said open position said valve permitting the flow of said inert gas into said container such that said inert gas displaces at least a portion of the carbon dioxide in said container, said timer causing said valve to cycle between said open and said closed positions at predetermined time intervals.

In another aspect the invention provides an apparatus for accelerated or controlled degassing of roasted coffee, the apparatus comprising a container for receiving and retaining roasted coffee; a sensor for measuring one or more gases retained in said container; a source of inert gas in fluid communication with said container; and a controller, said controller operatively associated with said sensor and said source of inert gas such that when said sensor is exposed to a predetermined concentration of said one or more gases, said controller causes inert gas to be delivered to said container, said inert gas displacing at least a portion of the one or more gases within said container.

In a further aspect the invention provides a method for accelerated or controlled degassing of roasted coffee, the method comprising the steps of loading a volume of roasted coffee into a container; sealing said container to limit contact between the roasted coffee and atmospheric air; with a carbon dioxide sensor, sensing the concentration of carbon dioxide within the container; delivering a signal from said sensor to a controller, said signal indicative of the concentration of carbon dioxide within the container, the controller being operatively associated with a source of pressurized nitrogen gas; if upon the receipt of said signal said controller determines that the concentration of carbon dioxide within the container exceeds a pre-determined value, said controller causing pressurized nitrogen gas to be delivered to the container, said nitrogen gas causing carbon dioxide within the container to be displaced and to be exhausted through a gas outlet.

Additional aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
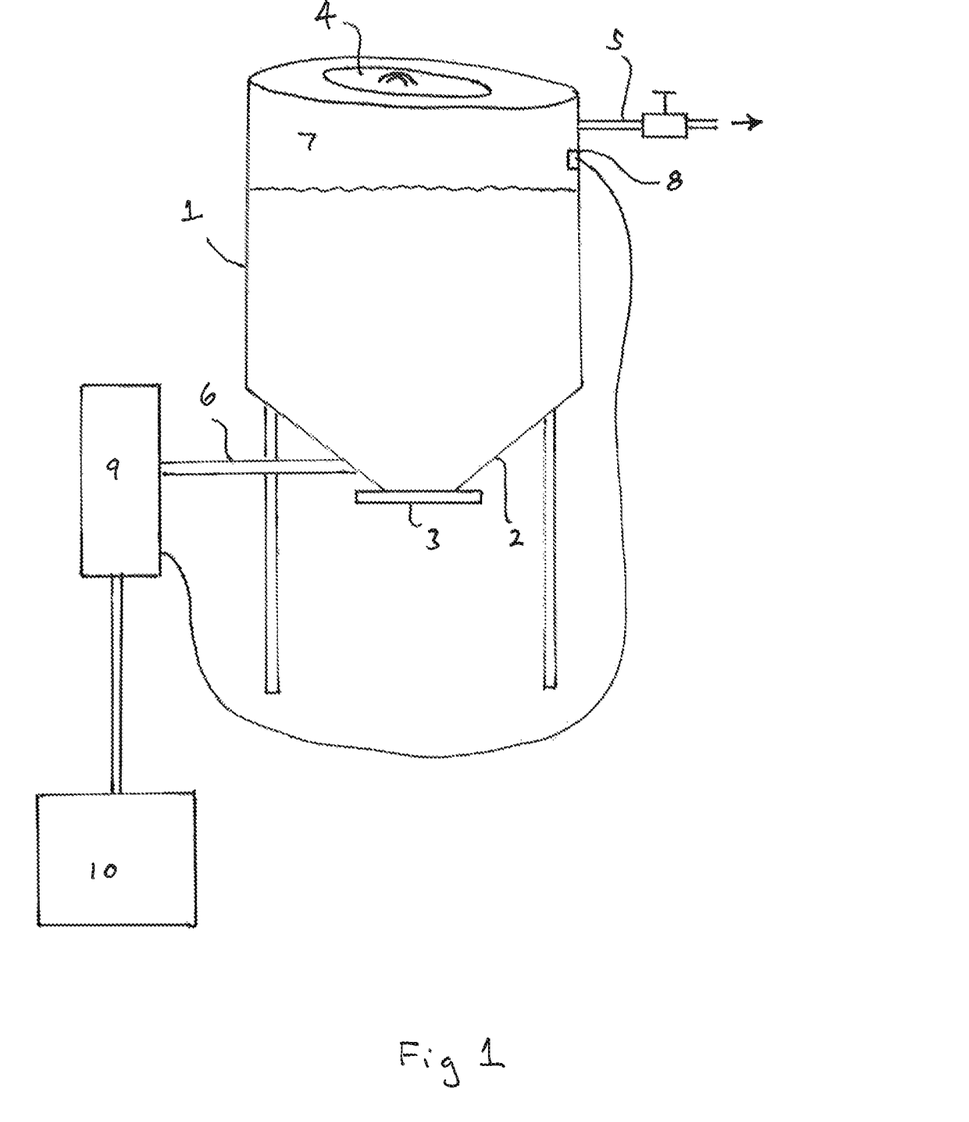
FIG. 1 is a schematic sectional view of an apparatus for accelerating or controlling the degassing of roasted coffee in accordance with an embodiment of the present invention.

With reference to FIG. 1 there is shown in schematic sectional view an apparatus that may be used for accelerating or controlling the degassing of roasted coffee. In general, the apparatus comprises a container 1 for receiving and retaining roasted coffee. The container may take any one of a number of different physical forms, including a tote, silo or bulk bin. In many cases, the container will have a sloped or conical lower portion 2 and a bottom exit port or dispenser 3 to permit the roasted coffee to be readily dispensed from the container for packaging or other purposes. Commonly, the top of the container will be equipped with an opening to permit roasted coffee to be loaded into the container. A cover or cap 4 may be used to seal the container and to help prevent the intrusion of air, which could cause oxidation of the coffee. The container further includes a gas outlet 5 at or near a first end (for example, its upper end or top surface) and an inert gas inlet 6 at or near a second end (for example, its lower end or bottom surface).

Roasted coffee (which may be in the form of ground coffee or whole coffee beans) is first loaded into container 1 to a pre-determined level that leaves an unoccupied head space 7 at the top of the container between the coffee and the container's upper surface. The upper opening in the container may be then sealed with cover 4 to help keep out air and other contaminants. Once received within the container, the roasted and/or ground coffee will begin to immediately degas and the level of carbon dioxide within the container will rise. Since carbon dioxide is heavier than air, as carbon dioxide evolves from the coffee it will exhibit a tendency to settle toward the bottom of container 1. Entrapped air that may exist within the container will be diluted by the carbon dioxide released from the coffee and/or will be displaced outwardly through gas outlet 5.

A carbon dioxide sensor 8, located in either gas outlet 5 or at the upper end of the container in head space 7, monitors the concentration of carbon dioxide as it builds within the container. Sensor 8 can be configured to continuously provide a signal to a controller 9 and to thereby provide a continuous indication of the concentration of carbon dioxide within container 1. Alternatively, the sensor can be configured such that a signal is sent to the controller once the concentration of carbon dioxide within the container exceeds a predetermined value. In either case, once controller 9 either receives a signal from the sensor indicating that the carbon dioxide concentration in the container is beyond a predetermined level, or when the continuous signal sent by the sensor to the controller is such that the controller recognizes the carbon dioxide level to exceed the predetermined level, the controller causes inert gas (most commonly nitrogen gas) from a pressurized supply 10 to be introduced into the container through inert gas inlet 6. Typically the controller will cause a solenoid valve 14 within the inert gas supply line to open and close as needed to deliver inert gas to the container. As the inert gas is introduced, the level or concentration of carbon dioxide in the container will be reduced, with the inert gas displacing at least a portion of the carbon dioxide out through gas outlet 5. When sensor 8 detects a drop in the concentration of carbon dioxide below a predetermined level, controller 9 will cause the flow of inert gas into the container to cease.

It will be appreciated by those having knowledge of the coffee roasting and packaging industry that the most common inert gas that is used in coffee packaging is nitrogen. In the case of the current invention, inert is meant to refer to gas that does not negatively react with the roasted coffee and that does not exhibit a tendency to restrict the degassing of the coffee. It will also be appreciated that the inert gas should not be harmful for human consumption within the limits of that which could be expected when used in association with coffee roasting and packaging.

Figure 2:
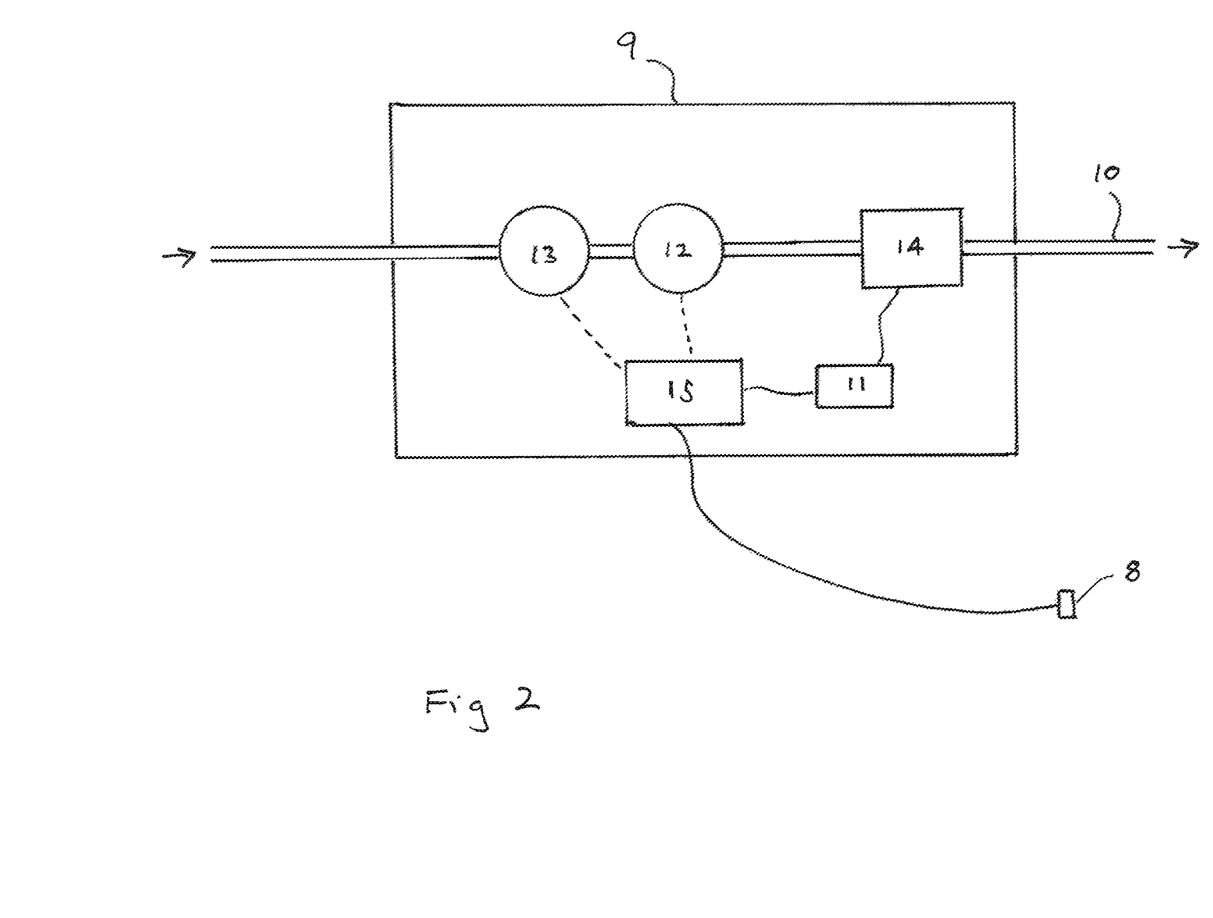
FIG. 2 is a schematic view of a control system that may be used in association with the apparatus depicted schematically in FIG. 1.

Controller 9 may include, or may have associated with it, one or more different components to control or regulate the amount of inert gas delivered through inert gas inlet 6. For example, the controller may include a timer 11 associated with solenoid valve 14 causing pressurized inert gas to be delivered to the container for a predetermined length of time (that time will largely be a function of the size of the container, the amount of coffee contained therein, the degree of roasting, the concentration of carbon dioxide within the container, the degree of degassing required, etc). Further, the controller may include a flow controller 12 to regulate the volume of inert gas that is delivered to container 1. The controller may also include a pressure regulator 13 to regulate the pressure of the inert gas that is delivered. In yet a further embodiment, the controller may include a combination of a timer and/or a flow controller and/or a pressure regulator. A central processing unit 15 receives the signal or signals from sensor 8 and controls the opening and closing of solenoid valve 14, either through direct connection to the solenoid or through the control of timer 11, which in turn controls the solenoid. In some instances the central processing unit may also control the flow controller and/or the pressure regulator (see dashed lines in FIG. 2).

In an alternate embodiment of the invention there may be provided an oxygen sensor in fluid communication with container 1. The oxygen sensor will monitor the concentration of $O_2$ within the container and provide a signal to controller 9. Should the controller receive a signal indicating that the concentration of oxygen gas within the container exceeds a pre-determined level (for example, 10%) the controller will cause inert gas from supply 10 to be introduced into the container through gas inlet 6. Once the $O_2$ level in the container has dropped below a predetermined level (for example, 2%) the controller will cause the flow of inert gas into the container to cease. In this manner the level of oxygen gas within the container can be regulated to minimize oxidation of the coffee retained therein. The oxygen sensor could be a separate dedicated sensor, or could be combined with the carbon dioxide sensor into a single sensor or sensor pack.

It will be appreciated that the described apparatus and methodology allows for an accelerated or a controlled degassing of roasted coffee. That is, in the normal course where the described apparatus and methodology is not employed, carbon dioxide naturally evolves from the roasted coffee received within container 1. If left to its own state of evolution, the concentration of carbon dioxide within the container will increase, with carbon dioxide gas slowly seeping outwardly from the top of the container. However, it will be appreciated that with an increased carbon dioxide concentration in the environment that immediately surrounds the roasted coffee, the diffusion of carbon dioxide outwardly from the individual coffee beans or coffee grounds is diminished. A reduction in the rate of release of carbon dioxide from the coffee slows down the overall degassing process.

The applicant has found that by reducing the concentration of carbon dioxide within the container, the rate of diffusion of carbon dioxide from the roasted coffee will tend to increase, or to at least remain at a relatively steady state without the traditional decrease that is experienced through the use of current degassing equipment and methodologies. Through the employment of the described invention the injection of nitrogen gas into the container will thus result in a lowering of the concentration of carbon dioxide within the container and will help to "encourage" a release of carbon dioxide from the coffee. When the flow of inert gas is stopped, the carbon dioxide levels within the container will again slowly begin to rise, until such time as sensor 8 signals the controller that the carbon dioxide concentration is such that degassing is being hindered, in which case the controller will cause inert gas to once again be introduced into the container in order to reduce carbon dioxide levels. Through cycling the injection of inert gas, the carbon dioxide concentration can thus be controlled and maintained generally within a range that permits an enhanced or accelerated degassing, over and above what can be typically achieved through traditional means.

Through the utilization of the described structure and method the length of time required for the overall degassing process can be reduced. At the same time, controlling the injection of inert gas into the container so that the concentration of carbon dioxide is maintained within a predetermined range helps to ensure that too much carbon dioxide is not removed and that significant aromatics are not lost.

In an alternate embodiment, the apparatus does not include a sensor 8. Instead, controller 9 is equipped with a timer that operates solenoid valve 14. The timer will be pre-programmed to periodically cycle the solenoid to start and stop the flow of nitrogen gas into the container. In this embodiment, a calculation is first made to determine a general rate of evolution of carbon dioxide gas from the roasted coffee. Then, based upon that calculation, the timer (or a CPU that controls the timer) is programmed to cause the solenoid to deliver nitrogen gas (at a known or controlled rate of flow and pressure) to the container for a predetermined length of time. That length of time is calculated to allow for the removal of carbon dioxide and a reduction in the concentration of carbon dioxide within the container without a significant loss of aromatics. In this embodiment the flow of inert gas into the container would be automatically cycled on and off for a period of time which would correspond to the length of time necessary for the coffee to sufficiently degas to permit packaging.

It will thus be appreciated that the described apparatus and method permits roasted coffee to be degassed at an accelerated or a controlled rate without a significant loss of aromatics. The apparatus and method are adaptable for use in association with a wide variety of different containers, container sizes, for different coffee roasts, etc.

It is to be understood that what has been described are the preferred embodiments of the invention. The scope of the claims should not be limited by the preferred embodiments set forth above, but should be given the broadest interpretation consistent with the description as a whole.

We claim:

1. An apparatus for accelerated or controlled degassing of roasted coffee, the apparatus comprising:
    a container for receiving and retaining roasted coffee, said container having an upper portion and a lower portion, said lower portion having an inert gas inlet and said upper portion having a gas outlet;
    a cover to seal said container when filled or partially filled with roasted coffee to prevent the intrusion of air;
    a source of inert gas in fluid communication with said inert gas inlet; and
    a controller, said controller including a timer and a valve, said valve operatively associated with said source of inert gas and having an open and a closed position, when in said closed position said valve restricting the flow of said inert gas into said container, when in said open position said valve permitting the flow of said inert gas into said container such that said inert gas displaces at least a portion of the gas within said container with said displaced gas exiting said upper portion of said container through said gas outlet while minimizing the loss of aromatics, said timer causing said valve to cycle between said open and said closed positions at predetermined time intervals.

2. The apparatus as claimed in claim 1 wherein said source of inert gas is a source of pressurized nitrogen gas.

3. The apparatus as claimed in claim 2 including an oxygen sensor monitoring the concentration of oxygen in said container, when the concentration of oxygen within said container exceeds a pre-determined level said controller causing said valve to open to permit inert gas to be delivered to said container until the concentration of oxygen is decreased to a pre-determined level.

4. The apparatus as claimed in claim 2 wherein said valve is a solenoid valve and said controller includes one or more of a flow controller to regulate the volume of nitrogen gas delivered to said container, and a pressure regulator to regulate the pressure of nitrogen gas that is delivered to said container.

5. An apparatus for accelerated or controlled degassing of roasted coffee, the apparatus comprising:
    a container for receiving and retaining roasted coffee, said container having an upper portion and a lower portion, said lower portion having an inert gas inlet and said upper portion having a gas outlet;
    a cover to seal said container when filled or partially filled with roasted coffee to prevent the intrusion of air;
    a sensor for measuring one or more gases retained in said container;
    a source of inert gas in fluid communication with said inert gas inlet; and
    a controller, said controller operatively associated with said sensor and said source of inert gas such that when said sensor is exposed to a predetermined concentration of said one or more gases, said controller causes inert gas to be delivered to said lower portion of said container, said inert gas displacing at least a portion of the one or more gases within said container with said displaced gases exiting said upper portion of said container through said gas outlet while minimizing the loss of aromatics.

6. The apparatus as claimed in claim 5 wherein said sensor is located in said gas outlet.

7. The apparatus as claimed in claim 6 wherein the inert gas is pressurized nitrogen gas.

8. The apparatus as claimed in claim 7 including a solenoid valve in fluid communication between said source of inert gas and said inert gas inlet.

9. The apparatus as claimed in claim 8 wherein said controller includes a timer that operates said solenoid valve to permit the flow of nitrogen gas through said inert gas inlet and into said container for a predetermined length of time.

10. The apparatus as claimed in claim 8 wherein said controller includes a flow controller to regulate the volume of nitrogen gas that is delivered to said container.

11. The apparatus as claimed in claim 8 wherein said controller includes a pressure regulator to regulate the pressure of nitrogen gas that is delivered to said container.

12. The apparatus as claimed in claim 8 wherein said controller includes one or more of (i) a timer that operates said solenoid valve to permit the flow of nitrogen gas through said inert gas inlet and into said container for a pre-determined length of time; (ii) a flow controller to regulate the volume of nitrogen gas delivered to said container; and (iii) a pressure regulator to regulate the pressure of nitrogen gas that is delivered to said container.

13. The apparatus as claimed in claim 5 wherein said sensor is a carbon dioxide gas sensor.

14. The apparatus as claimed in claim 5 wherein said sensor includes an oxygen sensor monitoring the concentration of oxygen in said container, when the concentration of oxygen within said container exceeds a pre-determined level said controller causing inert gas to be delivered to said container until the concentration of oxygen is decreased to a pre-determined level.

15. An apparatus for accelerated or controlled degassing of roasted coffee, the apparatus comprising:

a container for receiving and retaining roasted coffee, said container having an upper portion and a lower portion, said lower portion having an inert gas inlet and said upper portion having a gas outlet;

a cover to seal said container when filled or partially filled with roasted coffee and to limit the intrusion of air;

a source of pressurized nitrogen gas in fluid communication with said inert gas inlet; and a controller, said controller including a timer and a valve, said valve having an open and a closed position, when in said closed position said valve restricting the flow of nitrogen gas from said source of pressurized nitrogen gas and through said inert gas inlet into said container, when in said open position said valve permitting the flow of nitrogen gas into said lower portion of said container through said inert gas inlet such that said nitrogen gas displaces at least a portion of the gasses within said container with said displaced gases exiting said upper portion of said container through said gas outlet while minimizing the loss of aromatics, said timer causing said valve to cycle between said open and said closed positions at predetermined time intervals designed to permit a controlled degassing of the roasted coffee at a pre-determined rate.

16. The apparatus as claimed in claim 15 including an oxygen sensor monitoring the concentration of oxygen in said container, when the concentration of oxygen in said container exceeds a pre-determined level said controller causing said valve to open to permit inert gas to be delivered to said container until the concentration of oxygen is decreased to a pre-determined level.

17. The apparatus as claimed in claim 15 including a pressure regulator to regulate the pressure of nitrogen gas that is delivered to said container, said controller controlling said pressure regulator.

18. The apparatus as claimed in claim 15 wherein said controller includes a flow regulator to regulate the volume of nitrogen gas that is delivered to said container, said controller controlling said flow regulator.

* * * * *